United States Patent [19]
Parker et al.

[11] Patent Number: 5,483,585
[45] Date of Patent: Jan. 9, 1996

[54] APPARATUS FOR MANAGING AN ELEMENT MANAGER FOR A TELECOMMUNICATIONS SWITCH

[75] Inventors: John R. Parker; Nigel T. Lever; Philip Rutter; Timothy R. Fulcher, all of Suffolk, England

[73] Assignee: British Telecommunications, plc, United Kingdom

[21] Appl. No.: 194,353

[22] Filed: Feb. 10, 1994

[30] Foreign Application Priority Data

Dec. 29, 1993 [EP] European Pat. Off. .............. 93310596

[51] Int. Cl.⁶ .................................................. H04M 3/42
[52] U.S. Cl. ........................ 379/201; 379/207; 379/211; 379/212; 379/216; 379/93
[58] Field of Search .................................. 379/201, 207, 379/211, 212, 215, 216, 93

[56] References Cited

U.S. PATENT DOCUMENTS

| | | | |
|---|---|---|---|
| 5,012,511 | 4/1991 | Hanle et al. | 379/201 |
| 5,243,643 | 9/1993 | Sattar et al. | 379/201 |
| 5,309,509 | 5/1994 | Cocklin et al. | 379/207 |
| 5,345,380 | 9/1994 | Babson, III et al. | 379/201 |

FOREIGN PATENT DOCUMENTS

WO93/18598  9/1993  WIPO .

OTHER PUBLICATIONS

Maynard-Smith, "The Network Management Domain", ICL Technical Journal, vol. 7, No. 4, Nov. 1991, Oxford GB, pp. 763–779.

Blume et al, "Control and Operation of SDH Network Elements", Ericsson Review, vol. 69, No. 3, 1992, Stockholm, Sweden, pp. 62–77.

Primary Examiner—Jeffery A. Hofsass
Assistant Examiner—Parag Dharia
Attorney, Agent, or Firm—Nixon & Vanderhye

[57] ABSTRACT

A public telecommunications system includes a local exchange 10, an element manger 11 for managing the exchange 10 and a configuration manager 12 for managing the element manager 11. The element manager 11 is located with the exchange 10 and the configuration manger 12 is situated at a distant location. The exchange 10, element manager 11 and configuration manager 12 are connected by communication links 18, 19. In order to provide a new or existing customer with basic telephony services or one or more supplementary services such as call forwarding, the configuration manager 12 sends an appropriate set of requests to the element manager 11. If one or more of the requests are not successfully performed in the element manager 11, the configuration manger 12 sends further requests to the element manager 11 to cancel the requests which have been successfully performed and thereby return the element manager 11 to its original configuration.

9 Claims, 5 Drawing Sheets

APPARATUS FOR MANAGING AN ELEMENT MANAGER FOR A TELECOMMUNICATIONS SWITCH

BACKGROUND

1. Field of the Invention

This invention relates to a method of operating an apparatus for managing an element manager for a telecommunications switch and also to an apparatus for managing an element manager for a telecommunications switch.

2. Related Art and Other Considerations

It is known to manage a telecommunications switch with a computer located at a central location. The computer sends messages for managing the switch across a proprietary interface. However, major changes to the configuration of the switch or the introduction of a new type of switch requires considerable modification to the software of the computer at the central location. In order to overcome this problem, it has been proposed to provide an element manager, which may be located alongside the switch, for managing the switch and which sends messages to the switch across a proprietary interface. In this arrangement, the element manager itself can be managed by a computer situated at a central location and which sends messages to the element manager across a standard interface. With this arrangement, major modifications to the configuration of the switch or the introduction of a new type of switch can be made with relatively small modifications to the software of the computer. However, a reliable method is needed for operating the computer when it is instructing the element manager to configure the switch to provide or remove services for customers.

SUMMARY

According to one aspect of this invention, there is provided a method of operating an apparatus for managing an element manager for a telecommunications switch, said method comprising the steps of generating an initial set of requests in the apparatus for configuring the element manager so as to provide, remove or modify at least one service for a specified customer, transmitting the initial set of requests from the apparatus to the element manager, checking confirmation responses received from the element manager to determine if all the requests of the initial set of requests have been successfully performed in the element manager, in the event that at least one of said initial set of requests has not been successfully performed in the element manager generating a further set of requests for cancelling any requests of the initial set of requests which have been successfully performed in the element manager, and transmitting the further set of requests from said apparatus to said element manager.

By generating the further set of requests in the event that one of the initial requests has not been successfully performed, it is ensured that the switch is not left in a state where it is only partially configured with respect to adding or removing a service.

Conveniently, the method includes the additional steps of retrieving an existing set of data from a data store which indicates the services presently provided for the specified customer, receiving a new set of data which indicates the services now desired for the specified customer, and comparing the existing set of services with the new set of services, the result of the comparison being used in the step of generating the initial set of requests.

Preferably, the method includes the additional step of updating the data contained in the data store relating to the specified customer after determining that all the requests of the initial set of requests have been successfully performed in the element manager.

According to a second aspect of this invention, there is provided an apparatus for managing an element manager for a telecommunications switch, the apparatus comprising means for transmitting requests to an element manager, means for receiving confirmation responses from the element manager, means for generating an initial set of requests for configuring the element manager so as to provide, remove or modify at least one service for a specified customer, means for checking confirmation responses received from the element manager to determine if all the requests of the initial set of requests have been successfully performed in said element manager, and means for generating a further set of requests for cancelling any request from the initial set of requests which have been successfully performed in the element manager in the event that at least one of the initial set of requests has not been performed in the element manager.

According to a third aspect of this invention there is provided a telecommunications system comprising an apparatus as set out in the second aspect of this invention, an element manager managed by said apparatus, and a telecommunications exchange managed by the element manager.

BRIEF DESCRIPTION OF THE DRAWINGS

This invention will now be described in more detail, by way of example, with reference to the accompanying drawings in which.

DETAILED DESCRIPTION OF THE DRAWINGS

Figure 1:
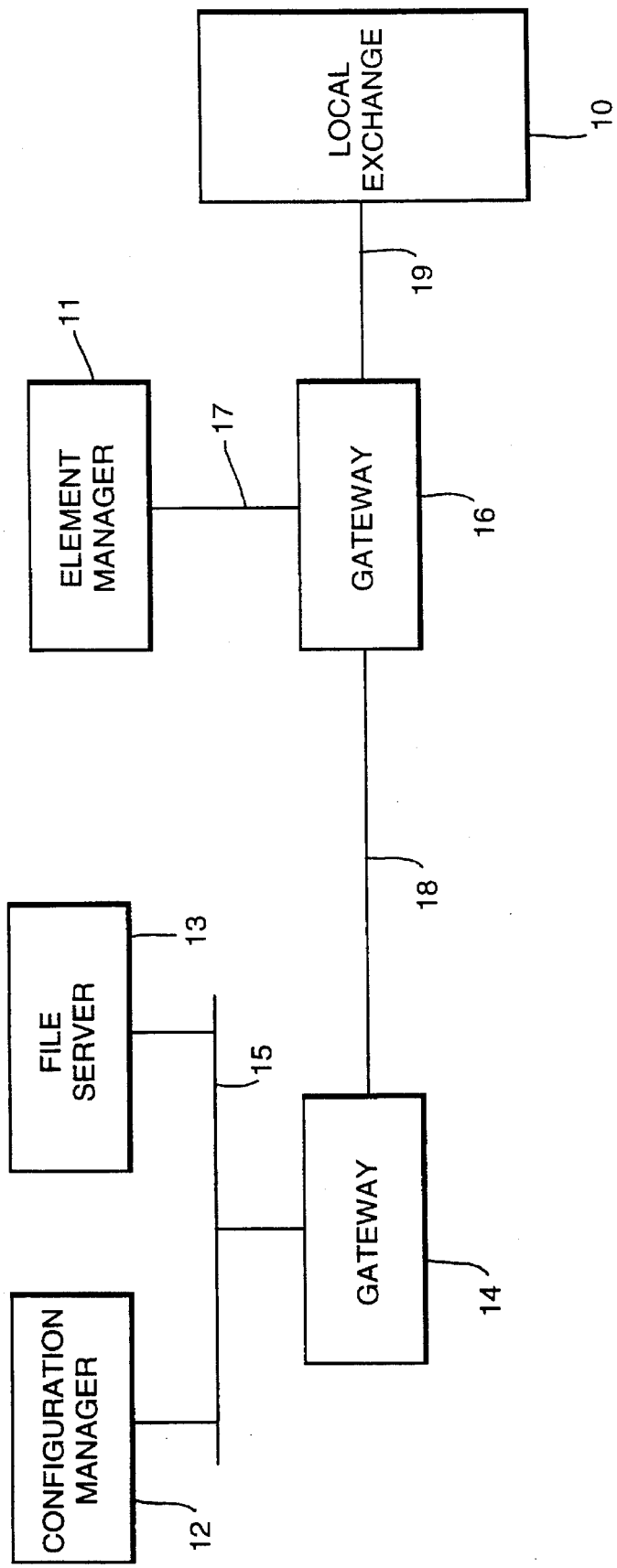
FIG. 1 is a block diagram of some components of a telecommunications system embodying this invention.

Referring now to FIG. 1, there is shown a block diagram of some of the components of a public telecommunications system which provides voice and other analogue communication services such as transmissions from facsimile machines between customers. The telecommunications system includes a local exchange or switch 10, an element manager 11 for the exchange 10 and a configuration manager 12 for the element manager 11. The exchange 10 may be a System X exchange manufactured by GEC Plessey Telecommunications or an AXE 10 exchange manufactured by Ericsson Telecommunications. The element manager 11 is a proprietary element manager supplied by the manufacturer of the exchange 10. The configuration manager 12 is a computer or workstation which includes a display screen and a keyboard and which is controlled by an appropriate program. The details of the program will be described below.

In the present example, the local exchange 10 and element manager 11 are located in the same building and the configuration manager 12 is located distantly at a central location. In this example, the element manager 11 is responsible for managing only the local exchange 10 but it is to be understood that the present invention can be applied in a system in which a single element manager manages two or more exchanges. Similarly, the configuration manager 12 is responsible for managing only the element manager 11 but it is also to be understood that the present invention can be applied to a system in which a single configuration manager is responsible for managing several element managers.

The configuration manager 12 is connected to a file server 13 and a gateway 14 by an Ethernet local network 15. Similarly, the element manager 11 is connected to a gateway 16 by an Ethernet local network 17. The gateways 14 and 16 and also the gateway 16 and exchange 10 are connected to each other by X25 communication links 18 and 19. Thus, the gateways 14 and 16 act as bridges between the Ethernet local network and the X25 telecommunications links.

Although in this example the present invention is described with reference to a public telephone system which provides voice and other analogue communications, it is to be understood that the present invention can be applied to both public and private telecommunications systems and to telecommunications systems which provide analogue services or digital data services or both.

The element manager 11 and the configuration manager 12 operate in what is known as an object-oriented environment. In an object-oriented environment, a computer program models real world physical objects and other real world entities. The physical objects and entities are simply known as objects. Where, as in the present case, the computer program is managing the real world objects, it models only those attributes of the real world objects which are necessary for management. When objects are modelled in this way, they are known as managed objects. A category of objects of the same or similar type is known as an object type. A particular real world object is said to be an instance of an object type. Thus, for example, in an exchange, an access port might be an example of an object type and the individual access ports in the exchange are instances of that object type.

Program modules which model real world objects are also known as objects. The software implementation of object type is known as object class. Thus, an individual program module which models a particular real world object is known as an instance of the object class to which that object belongs. Each software object is identified by the name of the object class to which it belongs and by an identifier which is specific to the software object itself. In order to associate software objects in a hierarchical manner, the identifier for a particular object will comprise the full identifier for its superior object with an additional distinguishing identifier for the object itself. An object which is identified in this manner is said to be contained within the superior object. The data for each software object forms part of the object and can be modified only by program operations which are specific to that object. The data is said to be encapsulated by the object and it cannot be modified directly by another software object.

In the program of the element manager 11, the object classes include CUSTOMER-PROFILE, DIRECTORY-NUMBER, ACCESS-PORT, CUSTOMIZED-RESOURCES, CALL-FORWARDING, THREE-PARTY and CALL-WAITING. These object classes are defined in the European Telecommunications Standards Institute (ETSI) standard entitled the "Customer Administration Model". These object classes and their attributes will now be described.

Each instance of the object class CUSTOMER-PROFILE represents the data of a particular customer or subscriber of the exchange. The attributes of this object class include an identifier for the particular customer, the telephone or directory number of that customer and the access port of the exchange which is dedicated to that customer. The program of the element manager 11 includes an instance of the object class CUSTOMER-PROFILE for each existing customer of the exchange 10 and a new instance of this object class is created for each new customer.

Each instance of the object class DIRECTORY-NUMBER relates to one of the directory numbers which is available on the exchange 10. For each directory number which is already assigned to an existing customer, the attributes of the corresponding instance of the object class DIRECTORY-NUMBER include the identifiers for the instances of the object classes CUSTOMER-PROFILE and CUSTOMIZED-RESOURCES associated with that directory number. In the case of each directory number which is not yet assigned to a customer, the values of the attributes relating to the instances of CUSTOMER-PROFILE and CUSTOMIZED-RESOURCES of the corresponding instance of the object class DIRECTORY-NUMBER are blank.

Each instance of the object class ACCESS-PORT corresponds to one of the access ports of the exchange 10. In the case of an access port which is already assigned to a customer, the attributes of the corresponding instance of the object class ACCESS-PORT include the identifiers for the instances of the object classes CUSTOMER-PROFILE and CUSTOMIZED-RESOURCES associated with that access port. In the case of each access port which is not yet assigned to a customer, the values of the attributes relating to instances of CUSTOMER-PROFILE and CUSTOMIZED-RESOURCES of the corresponding instances of ACCESS-PORT are blank.

Each instance of the object class CUSTOMIZED-RESOURCES models the services which are provided for a particular customer. Each instance of the object class CUSTOMIZED-RESOURCES is contained within the instance of the object class CUSTOMER-PROFILE for the associated customer. The attributes of each instance of this object class include the identifiers for the instances of the object classes DIRECTORY-NUMBER and ACCESS-PORT for the associated customer. As will be explained below, the object classes CALL-FORWARDING, THREE-PARTY and CALL-WAITING relate to supplementary services. Where a customer is provided with one or more supplementary services, the attributes for the instance of the object class CUSTOMIZED-RESOURCES includes the identifiers for the instances of the relevant object classes for these supplementary services.

The object classes CALL-FORWARDING, THREE-PARTY and CALL-WAITING relate to the three supplementary services of call forwarding, three party calls and call waiting. The supplementary service of call forwarding allows a customer to have incoming calls forwarded to a destination which is set by that customer. The supplementary service of three party calls provides the ability for three parties to be involved in one call. The supplementary service of call waiting permits a user of the customers telephone to be informed of another incoming call while he is engaged on an existing call. Each instance of one of these object classes is contained within the instance of the object class CUSTOMER-PROFILE which relates to the customer provided with this service. When it is desired to provide a customer with one of these three supplementary services, an instance of the corresponding object class is created.

As will be explained in more detail below, when it is desired to provide basic telephony services or a supplementary service for a particular customer, instances of the various object classes used in the program of the element manger 11 are created or modified as appropriate.

Figure 2:
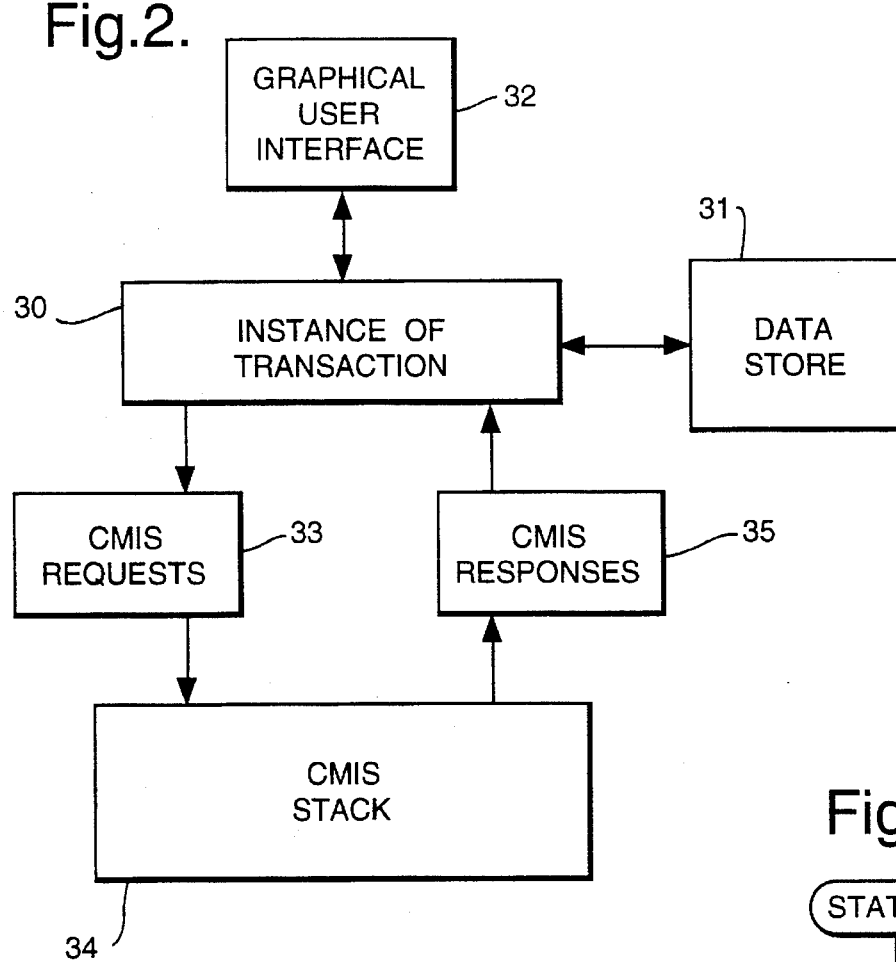
FIG. 2 is a block diagram of the components of the computer program used in a configuration manager which forms part of the telecommunications system of FIG. 1.

FIG. 2 illustrates the components of the program in the configuration manager 12. This program uses object classes TRANSACTION and CUSTOMER-PROFILE.

When it is desired to configure the element manager 11 so as to provide a new customer with basic telephone services, or provide an existing customer with a supplementary service, or remove a supplementary service or basic telephony services from an existing customer, the program generates an instance of the object class TRANSACTION. Such an instance of this object class is indicated by reference numeral 30 in FIG. 2. Each instance of TRANSACTION is responsible for generating the requests for achieving the desired configuration. This will be described in further detail below.

The object class CUSTOMER-PROFILE in the configuration manager 12 corresponds to this same object class in the element manager 11. For each existing customer, an instance of this object or data class is stored in an object store 31. As will be described below, a new instance of this object class is created for each new customer.

The program also includes a graphical user interface (GUI) 32. The GUI 32 is responsible for converting input data originating from the keyboard into a form for subsequent processing by the other parts of the program and for converting output data into a suitable form for showing on the display screen. GUIs are well established in the art and appropriate software packages are readily available.

Each instance of TRANSACTION prepares requests for the element manager 11 and receives responses from it by using an information service known as the Common Management Information Service (CMIS). The service is defined in ISO/IEC Standard number 9595. CMIS services are provided by a protocol known as the Common Management Information Protocol (CMIP) which is defined in ISO/IEC Standard 9596. CMIS services or requests includes the following: M-CREATE, M-SET and M-DELETE. An M-CREATE request is a request to create a new object in the form as specified in the request, an M-SET request is a request to set the attributes of a specified object to the values specified in the request, and M-DELETE is a request to delete a specified object. As will be explained, the configuration manager 12 issues these requests to the element manager 11. Upon successful completion of an M-CREATE, an M-SET or an M-DELETE request, the element manager 11 returns, respectively, an M-CREATE-RESPONSE, an M-SET-RESPONSE or an M-DELETE-RESPONSE response.

FIG. 2 shows the instance of transaction 30 sending CMIS requests 33 to a CMIS stack 34 and also receiving CMIS responses 35 from stack 34.

The CMIS stack 34 is responsible for converting CMIS requests from an instance of TRANSACTION into a form suitable for transmission on the communication link 19 and also for converting responses received on this link into a form suitable for transmission to an instance of TRANSACTION. The CMIS stack 34 comprises an element for converting CMIS requests into CMIP data units and CMIP data units into CMIS responses and a communications stack. A suitable software package for translating between CMIS requests and CMIP data units is available from British Telecommunications plc. A suitable software package for the telecommunications stack is available from Retix Corporation of Sainta Monica, Calif., USA.

Each instance of the object class TRANSACTION retrieves, stores and manipulates data. It stores the data as its attributes. Each instance of TRANSACTION can exist in seven states, namely, STATE 1 to STATE 7 and the flow charts for each of these states are shown in FIGS. 3 to 9. The general operation of an instance of TRANSACTION in each of the seven states will now be described generally. This will be followed by examples of providing a customer with basic telephony services, providing a customer with a supplementary service, removing a supplementary service from a customer and removing basic telephony services from a customer.

Figure 3:
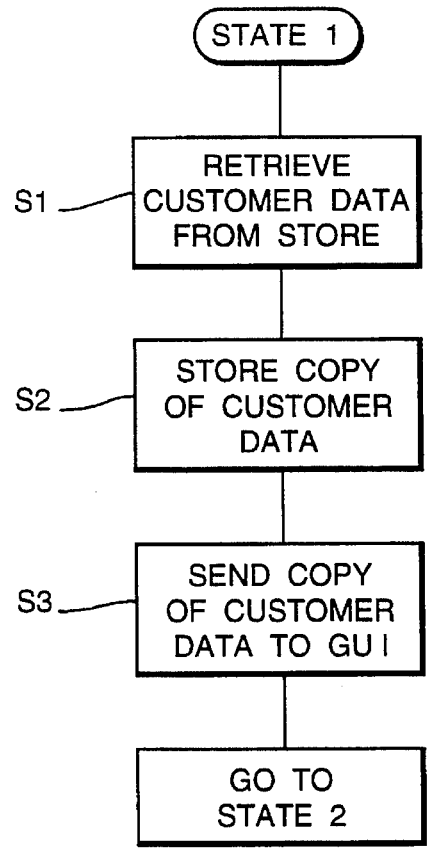
FIGS. 3 to 9 are flow charts illustrating the operation of the computer program.
Figure 4:
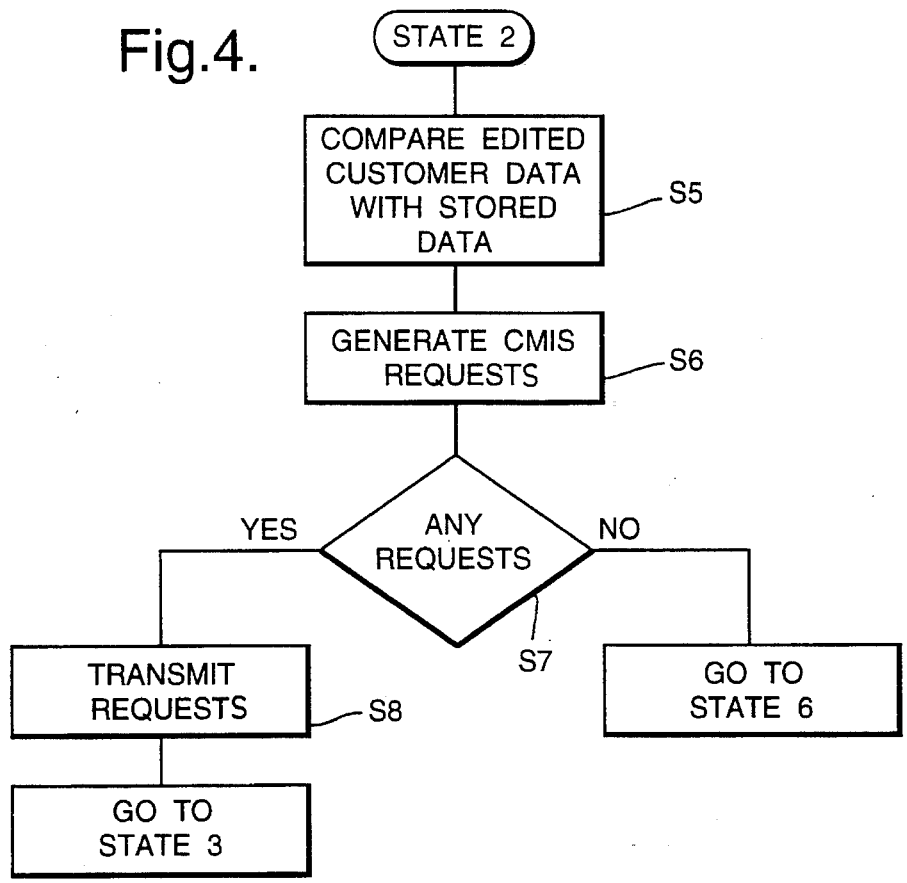

Referring now to FIG. 3, an instance of TRANSACTION enters STATE 1 after receiving a request from GUI 32 for data on a specified customer. After entering STATE 1, the instance of TRANSACTION retrieves the instance of the object class CUSTOMER-PROFILE from object store 31 for the specified customer. This instance contains the data on the customer. Then, in the step S2, it stores the instance of CUSTOMER-PROFILE as one of its attributes. In the step S3, it sends a copy of the instance of CUSTOMER-PROFILE to GUI 32. The data on the customer is then displayed on the display screen of configuration manager 12. In the event that the object store 31 does not contain data on the specified customer, this is indicated on the display screen.

At this stage, the user of the configuration manager 12 views the data on the display screen.

If the user wishes to create a new customer, there will be no data on the screen. The user therefore enters an identifier for the new customer and specifies a directory number and an access port for that customer. If the customer requires supplementary services, the user enters details of these. The GUI 32 then transmits the edited data entered by the user to the instance of TRANSACTION which stores the data as one of its attributes in the form of a new instance of the object class CUSTOMER-PROFILE. This instance of TRANSACTION then enters STATE 2.

After entering STATE 2, in a step S5 the instance of TRANSACTION compares the edited customer data which is present in the new instance of CUSTOMER-PROFILE with the stored data on the customer which is present in the instance of CUSTOMER-PROFILE retrieved from the data store 31. Following the comparison of step S5, in a step S6 it generates the CMIS requests which are necessary to configure the element manager 11 to provide the desired services. Then, in a step S7, it checks if any requests have been generated. In the event that no new services are required, no requests are generated. If this is the case, it enters STATE 6. If in step S7 it determines that requests have been generated, it goes to a step S8 in which it transmits the requests via CMIS stack 34 and gateways 14 and 16 to the element manager 11. It then awaits entry to STATE 3.

Figure 5:
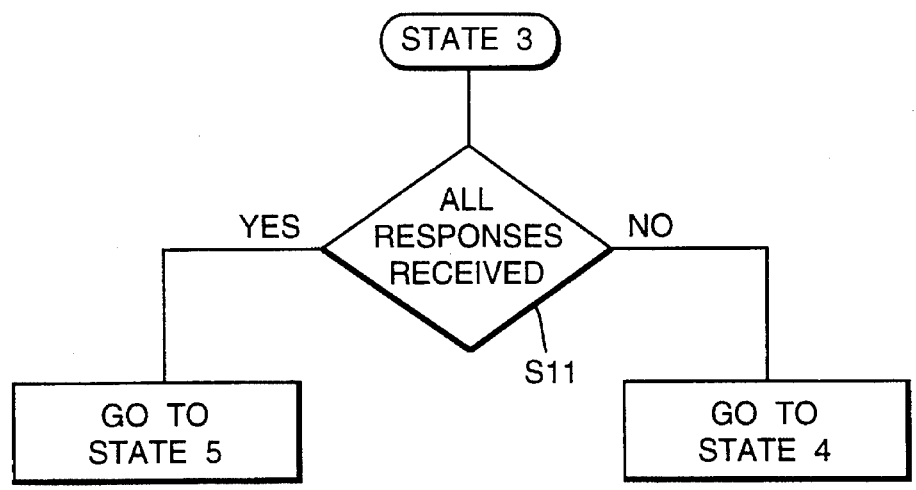

Referring now to FIG. 5, the instance of TRANSACTION enters STATE 3 after receiving a CMIS response. In a step S11, it makes a check to determine if a response has been received for each of the CMIS requests which it transmitted in step S8. If one or more responses have not been received, it goes to STATE 4. If all the response have been received, it goes to STATE 5.

As just explained, the instance of TRANSACTION enters STATE 4 in the event that one or more of the expected responses to the CMIS requests have not been received. In such circumstances, it is likely that the element manager 11 will be partially configured with regard to the new data entered by the user of configuration manager 12. For example, if the user of the configuration manager 12 has entered data to provide a new customer with a basic telephony service, it may be that new instances of CUSTOMER-PROFILE and CUSTOMIZED-RESOURCES have been success fully created, the appropriate instance of DIRECTORY-NUMBER has the identifier for the instance of CUSTOMER-PROFILE in its attributes but the relevant instance of ACCESS-PORT does not have this identifier in its attributes. This is an undesirable situation. One possibility would be to report this situation to the user but this would have the disadvantage of forcing the user to take appropriate remedial action. Instead, and as will now be described, the element manager 11 is returned to its original configuration. Thus, in the example just given, the new instances of CUSTOMER-PROFILE and CUSTOMIZED-RESOURCES would be deleted and the identifier for the new customer would be removed from the relevant instance of DIRECTORY-NUMBER.

Figure 6:
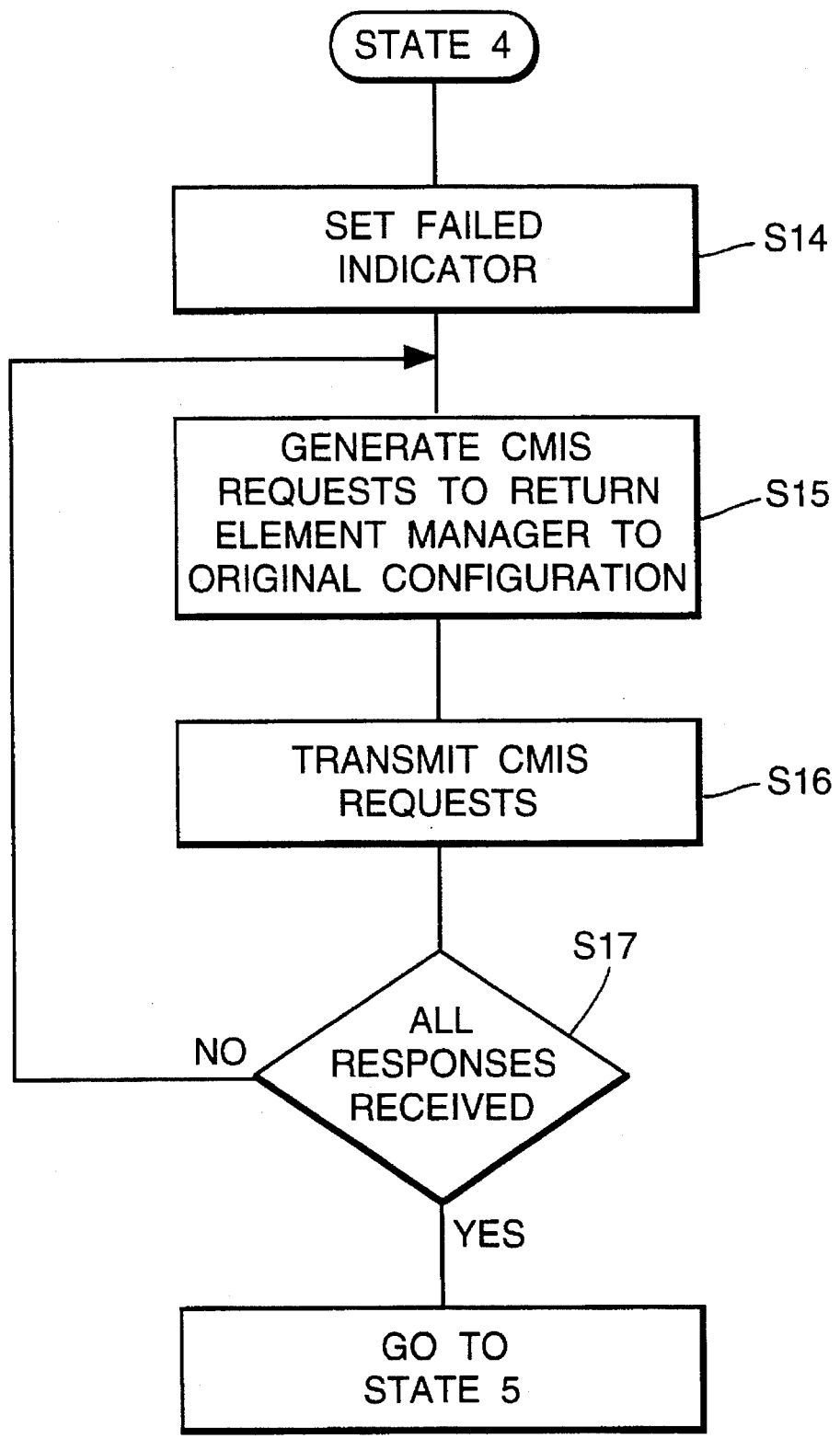

Referring now to FIG. 6, after entering STATE 4, in a step S14, a failed indicator is set. Then, in a step S15, a new CMIS request is generated to cancel each CMIS request which has been successfully completed in the element manager 11 so as to return the element manager 11 to its original configuration. Then, in a step S16, the or each new CMIS request is transmitted to the element manager 11.

In a step S17, a check is made to determine if a response has been received from the element manager 11 for each new CMIS request. If one or more responses have not been received, a return is made to step S15 and new CMIS requests are generated and transmitted as appropriate. When responses have been received for all of the new CMIS requests, the instance of TRANSACTION goes to STATE 5.

The instance of TRANSACTION enters STATE 6 from STATE 2 in the event that no CMIS requests are generated.

Figure 8:
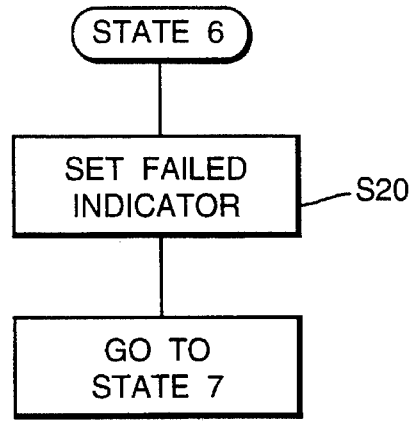

Referring now to FIG. 8, after entering STATE 6, the failed indicator is set in a step S20. The instance of TRANSACTION then goes to STATE 5.

Figure 7:
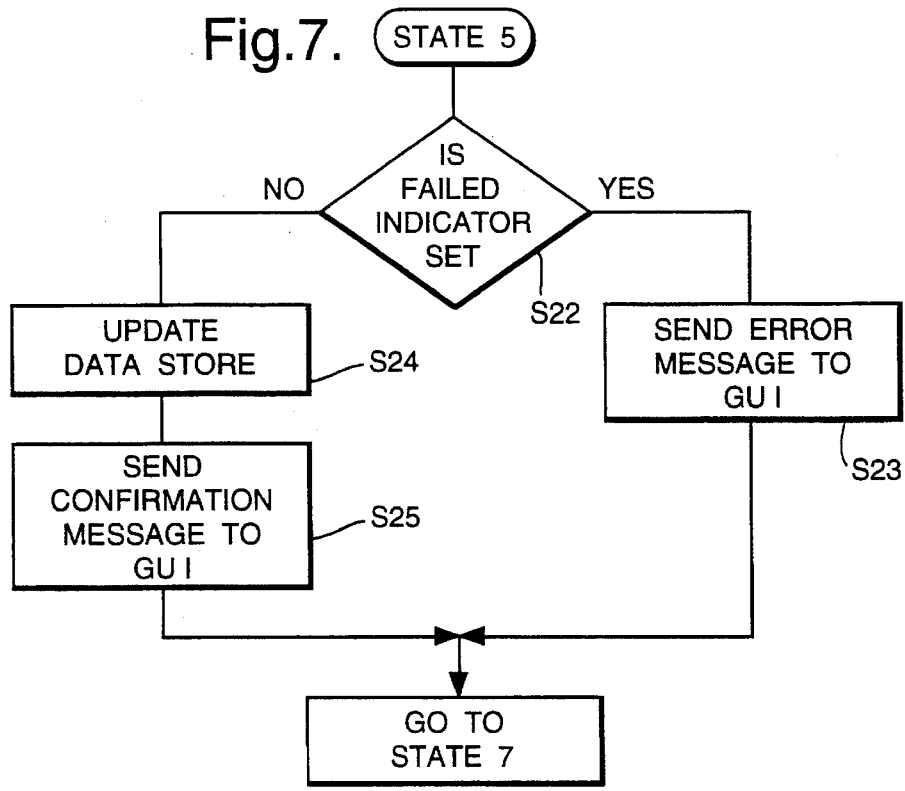

Referring now to FIG. 7, after entering STATE 5, the instance of TRANSACTION makes a check in a step S22 to determine if the failed indicator is set. If it is set, it sends an error message to GUI 32 in a step S23. In the event that the failed indicator was set in step S14 because one or more of the CMIS requests had not been completed, the message states that the element manager 11 has not been configured in accordance with the new data entered by the user of the configuration manager 12. In the event that the failed indicator was set in step S20 because no CMIS requests were generated in step S6, the error message state that no change to the configuration of element manager 11 is necessary to meet the requirements set out in the new data entered by the user. The message is displayed on the display screen. The instance of TRANSACTION then goes to STATE 7.

If it is found in step S22 that the failed indicator is not set, then in a step S24, the object store 31 is updated with the new details of the appropriate customer. More specifically if the new details relate to an existing customer, the attributes of the corresponding instance of CUSTOMER-PROFILE for the customer are updated. If the new details relate to a new customer, a new instance of CUSTOMER-PROFILE is created in data store 31 for that customer. In a step S25, a confirmation message is sent to GUI 32 which states that the element manager 11 has been configured in accordance with the new data entered by the user. The instance of TRANSACTION then goes to STATE 7.

Figure 9:
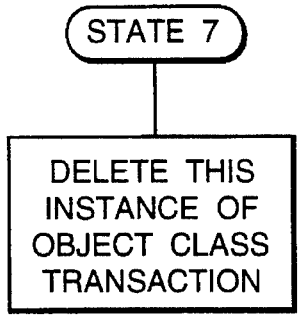

Referring now to FIG. 9, after entering STATE 7, this instance of TRANSACTION is deleted.

There will now be described four examples of the CMIS requests which are generated in step S6 to provide or delete existing services.

In order to provide a new customer with basic telephony services, two M-CREATE requests and two M-SET requests are generated. The first M-CREATE request creates a new instance of CUSTOMER-PROFILE which includes an identifier for the new customer, an identifier for the directory number of that customer and an identifier number for the access port of that customer in its attributes. The second M-CREATE request creates a new instance of CUSTOMIZED-RESOURCE contained within the new instance of CUSTOMER-PROFILE and with the identifiers of the access port and the directory number of the new customer in its attributes. The first M-SET requests sets the attributes of the relevant instance of ACCESS-PORT so that they include the identifiers for the new instances of CUSTOMER-PROFILE and CUSTOMIZED-RESOURCES. The second M-SET request sets the attributes of the relevant instance of DIRECTORY-NUMBER so that they include the identifiers for the new instances of CUSTOMER-PROFILE and CUSTOMIZED-RESOURCES.

In order to add the supplementary service of call forwarding to an existing customer, an M-CREATE request and an M-SET request are generated. The M-CREATE request generates a new instance of CALL-FORWARDING which is contained within the instance of CUSTOMER-PROFILE for the specified customer. The M-SET request sets the attributes of the relevant instance of CUSTOMIZED-RESOURCE so that they include the identifier for the new instance of CALL-FORWARDING.

In order to delete call forwarding from an existing customer, an M-DELETE request and an M-SET request are generated. The M-DELETE request deletes the relevant instance of CALL-FORWARDING. The M-SET request removes the identifier for the instance of CALL-FORWARDING from the attributes of the relevant instance of CUSTOMIZED-RESOURCE.

In order to remove basic telephony services from an existing customer, two M-DELETE requests and two M-SET requests are generated. The two M-DELETE requests delete the relevant instances of CUSTOMER-PROFILE and CUSTOMIZED-RESOURCES. The two M-SET requests remove the identifiers for the deleted instances of CUSTOMER-PROFILE and CUSTOMIZED-RESOURCES from the relevant instances of ACCESS-PORT and DIRECTORY-NUMBER.

In the example of the present invention which has been described above, when it is desired to provide basic telephony services for a new customer, the user manually inputs identifiers for the new directory number and access port. Alternatively, these may be generated automatically. In order to do this, a store is provided containing a list of available directory numbers and another store is provided which contains a list of available access ports.

We claim:

1. A method of operating an apparatus for managing an element manager for a telecommunications switch, said method comprising the steps of:

generating an initial set of requests in the apparatus for configuring the element manager so as to provide, remove or modify at least one service for a specified customer;

transmitting the initial set of requests from the apparatus to the element manager;

checking confirmation responses received from the element manager to determine if all the requests of the initial set of requests have been successfully performed in the element manager;

in the event that at least one of the initial set of requests has not been successfully performed in the element manager, generating a further set of requests for cancelling any request of the initial set of requests which have been successfully performed in the element manager; and transmitting the further set of requests from the apparatus to the element manager.

2. A method as claimed in claim 1, including the additional steps of:

retrieving an existing set of data from a data store forming part of the apparatus for managing the element manager which indicates services presently provided for the specified customer;

receiving a new set of data which includes the services now desired for the customer; and comparing the existing set of data with the new set of data, the result of the comparison being used in the step of generating the initial set of requests.

3. A method as claimed in claim 2, including the additional step of updating the data included in the data store relating to the specified customer after determining that all the requests of the initial set of requests have been successfully performed in the element manager.

4. A method as claimed in claim 1, in which said at least one service is the provision of basic telephony services for the specified customer.

5. A method as claimed in claim 1, in which said at least one service is the provision of a service which is supplementary to basic telephony services.

6. An apparatus for managing an element manager for a telecommunications switch, the apparatus comprising:

means for transmitting requests to an element manager;

means for receiving confirmation responses from the element manager;

means for generating an initial set of requests for configuring the element manager so as to provide, remove or modify at least one service for a specified customer;

means for checking confirmation responses received from the element manager to determine if all the requests of the initial set of requests have been successfully performed in said element manager; and means for generating a further set of requests for cancelling any request from the initial set of requests which has been successfully performed in the element manager in the event that at least one of the initial set of requests has not been successfully performed in the element manager.

7. An apparatus as claimed in claim 6, including:

a data store containing data of existing services provided for existing customers;

means for retrieving an existing set of data from the data store which indicates the service is provided for a specified customer;

means for receiving a new set of data which indicates the services now desired by the specified customer; and means for comparing the existing set of data with a new set of data for the specified customer, the results of the comparison being supplied to said means for generating an initial set of requests.

8. An apparatus as claimed in claim 7, including means for updating the data contained in the data store relating to a specified customer after determining that all the requests of an initial set of requests have been successfully performed in the element manager.

9. A telecommunications system comprising an apparatus as claimed in claim 6, an element manager managed by said apparatus, and a telecommunications exchange managed by said element manager.

\* \* \* \* \*